(12) United States Patent
Patel et al.

(10) Patent No.: US 6,606,181 B2
(45) Date of Patent: Aug. 12, 2003

(54) OPTICAL POWER LIMITING CONTROL

(75) Inventors: Jayantilal S. Patel, Newtown, PA (US); Zhizhong Zhuang, Yardley, PA (US)

(73) Assignee: Optellios, Inc., Ewing, NJ (US)

( * ) Notice: Subject to any disclaimer, the term of this patent is extended or adjusted under 35 U.S.C. 154(b) by 0 days.

(21) Appl. No.: 09/994,419

(22) Filed: Nov. 27, 2001

(65) Prior Publication Data

US 2002/0080462 A1 Jun. 27, 2002

Related U.S. Application Data

(60) Provisional application No. 60/257,792, filed on Dec. 22, 2000.

(51) Int. Cl.⁷ .............................. G02F 1/01; G02F 1/29; G02B 26/08
(52) U.S. Cl. ........................ 359/238; 359/298; 359/315; 359/320
(58) Field of Search ................................. 359/238, 298, 359/315, 320, 246, 251, 252, 253, 256, 279, 484, 485, 494, 495, 498, 499

(56) References Cited

U.S. PATENT DOCUMENTS

| | | | | |
|---|---|---|---|---|
| 4,364,639 A | | 12/1982 | Sinclair et al. ............... 349/57 |
| 4,613,207 A | * | 9/1986 | Fergason ....................... 349/5 |
| 4,994,204 A | | 2/1991 | Doane et al. .......... 252/299.01 |
| 5,015,057 A | | 5/1991 | Rumbaugh et al. ............. 349/1 |
| 5,069,813 A | | 12/1991 | Patel et al. ............ 252/299.01 |
| 5,323,251 A | | 6/1994 | Coates et al. .................. 349/89 |
| 5,548,427 A | * | 8/1996 | May ........................... 349/117 |
| 5,841,489 A | * | 11/1998 | Yoshida et al. ................ 349/17 |
| 5,956,437 A | | 9/1999 | Day et al. ....................... 385/2 |
| 5,999,152 A | | 12/1999 | Liao et al. ..................... 345/87 |
| 6,144,433 A | | 11/2000 | Tillin et al. .................. 349/123 |
| 6,151,086 A | | 11/2000 | Fergason ........................ 349/5 |
| 6,178,284 B1 | | 1/2001 | Bergmann et al. .......... 385/140 |
| 6,404,537 B1 | * | 6/2002 | Melman et al. ............. 359/323 |
| 6,404,553 B1 | * | 6/2002 | Wooteon et al. ............ 359/573 |

OTHER PUBLICATIONS

Copy of International Search Report International Application No. PCT/US01/44303 dated May 7, 2002.

* cited by examiner

Primary Examiner—Jordan M. Schwartz
Assistant Examiner—Tim Thompson
(74) Attorney, Agent, or Firm—Duane Morris LLP

(57) ABSTRACT

A controllable phase plate has numerous domains that are randomized as to the orientation of their birefringence and can be used in a power limiting control to produces an electrically controllable diffraction pattern having a portion, especially the zero mode axial spot of the pattern, that is directed onto an output aperture such as a pinhole or an optical fiber end. Controlling the phase plate produces an interference peak or null (or at an intermediate level) of light, coupled into the output aperture. The phase plate preferably comprises a liquid crystal with controllable birefringence. The domains have paired orthogonal orientations, which is a condition that is met in randomized domains. The paired orthogonal orientations make the device polarization insensitive. In a controllable attenuating device, collimating lenses are placed before and after the phase plate along a beam path to focus a clear interference pattern on a screen containing the output aperture. Several variations are disclosed including an electrically controllable phase plate arrangement using liquid crystal controllably birefringent material prepared in a polarization insensitive manner in zones, or preferably by providing random director orientation in a plane.

36 Claims, 8 Drawing Sheets

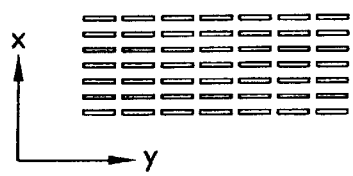
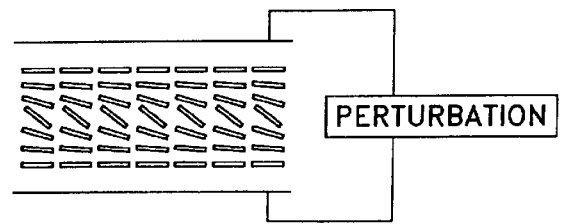
FIG. 3a  FIG. 3b
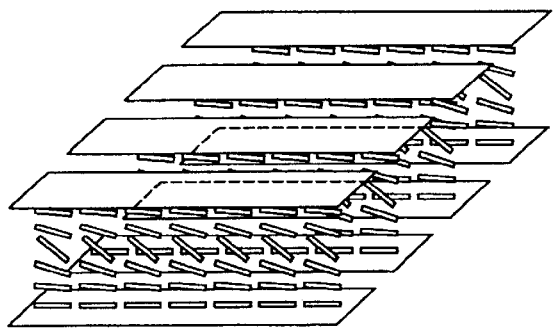
FIG. 4
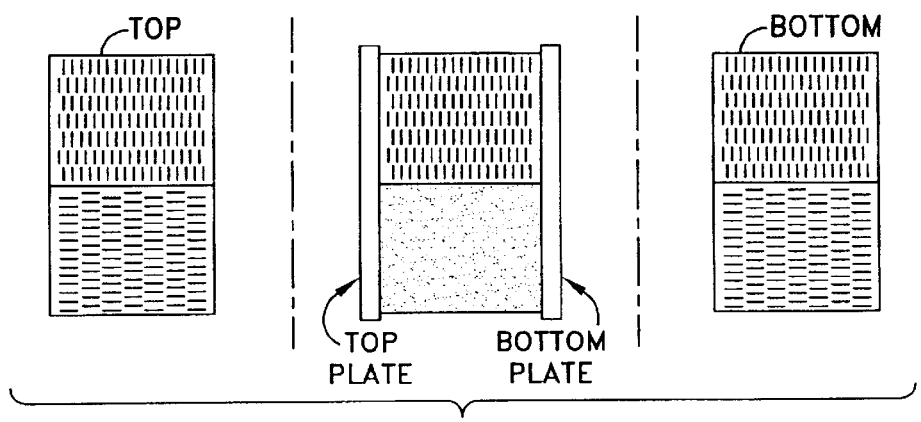
FIG. 5

TRANSMISSIVE

REFLECTIVE

OPTICAL POWER LIMITING CONTROL

CROSS REFERENCE TO RELATED APPLICATION

This application claims the priority of U.S. provisional application Ser. No. 60/257,792, filed Dec. 22, 2000.

BACKGROUND OF THE INVENTION

1. Field of the Invention

The invention concerns devices and methods for controlling the relative power level of electromagnetic energy propagating along a path, and in particular concerns use of electrically controllable interference effects in one or more liquid crystal elements, to vary the extent to which incident light energy directed along a transmission path is allowed to pass through an output orifice, thus being transmitted through the device, versus light energy directed along other paths, thus being blocked by the device.

The invention is particularly useful in pixel displays, fiber optic data transmission lines and other applications that advantageously either switch incident light on and off or controllably attenuate the light. The device operates without polarizers and at low voltages.

The device relies on a particular physical layout whereby a controllable element, preferably a liquid crystal, is placed to intercept light oriented to impinge on an output orifice. In the preferred embodiment the controllable element comprises an electrically controllable random phase plate which creates phase interference in the forward direction, such that the amount of phase cancellation along a zero order path to the output can be electrically controlled.

2. Prior Art

It may be advantageous for various reasons to control whether or not light energy will be transmitted or blocked at a given point. In connection with displays, for example, it is useful to individually control transmission of light at each point or pixel in an array. In connection with light transmission devices such as glass fiber optical waveguides and the like, it may be desirable to switch light on and off for signaling or perhaps to control the transmission amplitude or light intensity over a control range. It is particularly advantageous if these sorts of controls can be effected electrically, that is by application of a voltage or current signal to alter light transmission conditions. Other control parameters besides electrical inputs may also be useful, such as mechanical or temperature related parameters.

One technique for electrical control of the properties of light is to pass the light through a liquid crystal. It is known to provide an array of liquid crystal elements defining pixels in a display device. Liquid crystals are also employed as elements in certain types of filters, e.g., in optical transmission situations such as glass fiber optical waveguides.

Liquid crystals produce or rely upon light polarization effects because they have distinct optical properties in mutually perpendicular axes; i.e., they are "birefringent." The two axes are known as the "fast" axis and the "slow" axis, or sometimes as the "extraordinary" and the "ordinary" axes, $n_e$ and $n_o$. The liquid crystal material is typically positioned relative to an incident light beam such that these two axes, $n_e$ and $n_o$, define a plane normal to the propagation direction of incident light (the "z axis").

The incident light also has distinct spatial components, namely components aligned wholly or partly to one or both of two mutually perpendicular polarization axes. There is an interaction between the polarization attributes of the incident light and the birefringence axes of the liquid crystal material. This interaction is further affected by applying an electric field in the z axis direction (or potentially by using other effects such as temperature variation). Assuming an electro-optic effect, applying an electric field along the z-axis can alter the birefringence of the liquid crystal, specifically by changing the index of refraction of the liquid crystal material along the fast axis $n_e$, and not along the slow axis $n_o$. As a result, the polarization component of the incident light that corresponds to $n_e$ may experience different optical changes compared to the component corresponding to $n_o$. In short, the polarization components can be affected differently by passing through the liquid crystal. A polarization filter or a beam splitter responsive to polarization may then be used to discriminate between the respective components, for example to turn on or off a pixel in a display or otherwise to operate light as a function of polarization.

Such polarization and birefringence aspects may be useful but not all of their characteristics are necessarily advantageous. For example, assuming randomly polarized incident light, a device with a polarization dependent transmission aspect inherently rejects 50% of the incident light energy. For this reason, electro-optic liquid crystal birefringence effects may be inconsistent with the need to preserve available light energy so as to maximize the brightness of a display. In some situations it may be possible to employ polarization diversity techniques to preserve the light energy. This could involve serially positioned components to split, realign and recombine orthogonal polarization components to reduce or eliminate rejection as a function of polarization. Such techniques entail expense, bulk and potential light energy losses reasons other than polarization rejection, such as elongation of the beam path.

Liquid crystal material conventionally is oriented to a reference direction on a substrate. In some processes this involves rubbing or abrading a surface of a substrate. At least for some thickness, molecules that are spaced inwardly from the surface tend to align with the elongations of abrasion, known as the "rubbing axis."

Typically display devices that use discrete liquid crystals to control pixel brightness rely on polarization effects. For common polarizer based displays, the backlighting must be polarized so that switched effects relying on polarization achieve reasonably good contrast. This results in at least a 50% loss of possible light energy. In most polarizer-based displays, two polarizers are involved. One polarizes the incident light and another discriminates on the basis of polarization aspects that are switched on or off at each pixel. This has led to efforts to develop single polarizer based devices or perhaps dual orthogonal discrimination elements. Ultimately, it would be advantageous to eliminate polarizers.

One device that does not use polarization is the polymer dispersed liquid crystal (PDLC). This device operates on a principle of scattering the light when in an "off" state and passing the light (i.e., becoming transparent) in the "on" state. One disadvantage of a polymer dispersed liquid crystal (PDLC) device is that a polymer matrix surrounds the liquid crystal. The polymer matrix becomes part of an effective voltage divider, and reduces the voltage applied across the liquid crystal. The proportionate voltage reduction is determined by the effective capacitance of the polymer versus that of the liquid crystal. In some situations, to compensate for a considerable voltage drop across the polymer matrix, relatively large voltages must be applied across the device, e.g., on the order of 100V.

The switching operating principle of the PDLC is electrically to cause or prevent a mismatch in the index of refraction between the matrix and the liquid crystal. This changes the transmissivity/reflectivity characteristic of the boundary, making the light/dark appearance of the pixel controllable electrically.

It would be advantageous if a light handling technique could be developed that was free of the light energy rejection inefficiencies associated with polarization. However it would also be advantageous if the technique used low control voltages and modest power dissipation as typical of the electro-optic birefringent liquid crystal displays. Preferably, such a technique would reject as little incident light as possible, at least preserving more than the 50% level typical of a simple polarization dependent display. The technique should achieve a very high degree of contrast, using a low voltage, a good response time, and do so with a minimum requirement of additional components.

SUMMARY OF THE INVENTION

It is an object of the invention, among other objects, to employ the birefringence aspects of a controllable liquid crystal element as a phase interference element to produce switchable phase interference effects that control transmission of light along a transmission path, in a manner that is insensitive to polarization.

It is another object to achieve very high contrast between switched and unswitched conditions, using modest control voltages, while also permitting a continuous range of control when desired.

It is an object to optimize a device that meets all the foregoing objects, for applications including high density pixel displays in the visual band on one hand, and also fast switching glass fiber optical waveguide applications in the 1550 nm range.

These and other objects are accomplished by a controllable phase plate that produces a diffraction pattern having a portion, especially the zero order mode axial spot of the pattern, that is directed onto an output aperture such as a pinhole or an optical fiber end. By controlling the phase plate, an interference peak or null (or an intermediate level) is coupled into the output aperture. The phase plate preferably has a liquid crystal with controllable birefringence in small domains that have orthogonal director orientations. In a preferred arrangement the directors are randomized. This makes the device polarization insensitive. The device relies on having a propagation path for a light beam directed toward the output aperture, with the controllable phase interspersed along the path. Preferably, collimating lenses before and after the phase plate along the path produce a clear interference pattern focused in the area of the output aperture. Several variations are disclosed including an electrically controllable phase plate arrangement using liquid crystal controllably birefringent material prepared in a polarization insensitive manner in zones, or preferably by providing random director orientation in a plane.

BRIEF DESCRIPTION OF THE DRAWINGS

The drawings illustrate certain embodiments of the invention as presently preferred. It should be understood that the invention is subject to certain variations from the illustrated embodiments, within the scope of the invention defined by the appended claims, particularly insofar as the concepts taught in this disclosure are applied to practical devices. In the drawings.

FIGS. 3a and 3b are schematic illustrations, respectively showing unperturbed and perturbed alignments of molecules in a liquid crystal or similar birefringent material that is subject to perturbation by application of an electric field in an orthogonal or Z direction compared to the X-Y plane shown.

FIG. 4 is a perspective schematic corresponding to a plurality of zones as shown in FIGS. 3a and 3b.

FIG. 5 is a schematic illustration of an optical element in front elevation (the central view) and in two corresponding side elevations (the lateral views) from opposite sides, showing the relative alignment of birefringence structures, such as liquid crystal molecules, according to an inventive aspect.

DETAILED DESCRIPTION OF PREFERRED EMBODIMENTS

Figure 1A:
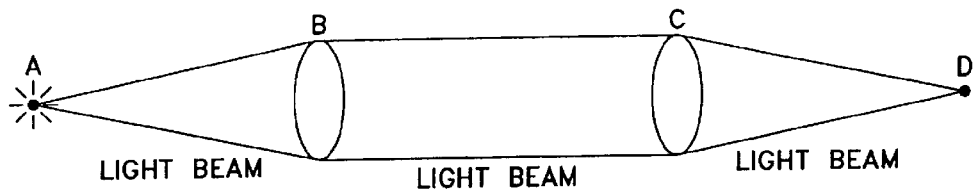
FIGS. 1a, 1b and 1c are schematic illustrations of optical arrangements according to the invention, wherein light from a "point" source is collimated and recombined at an output point, the figures respectively showing a single point source, a linear array and a pixilated X-Y array of points.

In discussing the illustrated embodiments, this description uses various terms that denote orientations, relative positions and the like, such as "vertical," "horizontal," etc. These terms and others like them are intended to facilitate discussion of the drawings and not to limit the invention to particular orientations unless so stated.

According to the invention, a very high contrast light modulator is provided, which can function without polarizers, at much lower control voltages than PDLC light modulators. Controllable liquid crystal elements are provided with molecules oriented in a randomized way that produces an optical interference pattern. The liquid crystals permit the pattern to be altered controllably to direct light into an output orifice to permit transmission, or outside of the orifice to block transmission, depending on the signal applied to the liquid crystal. Likewise the invention permits controlled transmission of any desired proportion of the incident light energy between maximum transmission and blockage. The invention is preferably optimized for operating at the 1550 nm wavelength commonly used in optical communications. However the invention is also applicable to other wavelengths such as the visible wavelengths used in displays. The invention is based on controllable phase interference, and thus uses a fundamentally different principle from that of PDLC devices.

Two structural aspects are needed to provide a controllable transmission device according to the invention. First, a light path is provided that is physically arranged normally to allow incident or input light to pass through because the incident light is directed toward an exit port. That is, the device has entrance and exit ports that are aligned. Second, an electrically controllable random phase plate is placed along the path between the entrance and the exit. The random phase plate is electrically controllable so as to adjust conditions of phase interference in a forward direction from the entrance to the exit. The phase cancellation conditions along the path from the entrance to the exit port, and the resulting spatially distributed peaks and nulls, can be electrically controlled. Thus by controllable phase cancellation, the device can align or misalign the greater part of the incident light energy relative to the exit port, thereby transmitting or blocking light transmission through the device, respectively.

The exit port can be a confined and masked orifice area immediately adjacent to a center axis of a light transmission path from the entrance to the exit. The phase cancellation conditions preferably are arranged by providing a collimated light beam that is incident on an electrically controllable liquid crystal element. The controllable phase cancellation at the exit port pursuant to the invention, facilitates transmission by providing an interference pattern in which the light energy is concentrated at the exit port, substantially because the interference pattern has an axial or centrally placed peak at the exit orifice. Conversely, transmission is blocked by producing an axial or central null at the exit orifice. A liquid crystal controllable element as described herein thus can be used as the phase interference element selectively to concentrate the incident light energy along a transmission path through the device, or not, depending on the signal applied to the liquid crystal element.

The invention is subject to embodiment in a variety of ways that produce the desired phase cancellation effect described. An exemplary embodiment is shown in the drawings, wherein phase cancellation is produced in a collimated beam.

Referring to FIG. 1(a), an input source of light energy can be provided in the form of a point source (A). The source could also have some finite diameter, but can be appreciated in this embodiment by considering an ideal point source. The source could be, for example, a tip of an optical fiber, a focused light spot or another source. Light from the source is collimated. In the embodiment shown, the light beam diverges from a point source (A) and a portion of the light from the source (A) is incident on a collimating lens (B) placed at a distance from the point source equal to the focal length of the lens. The light incident on the lens (B) is thus collimated or redirected into parallel rays forming a beam of light centered on an axis.

For purposes of illustration, the lens (B) is assumed to be a spherical lens of glass or a similar material wherein a difference in index of refraction redirects the light. It should be appreciated that various other structures can produce a collimated beam, including, for example, a parabolic reflector, a Fresnel lens, a distant diffuse source, etc. (not shown).

If undisturbed, the beam of collimated light is incident on a second collimating lens (C), placed along the axis, which can be the same as the first lens (B), and operates to concentrate the beam back into a point at the output of the device. The second collimating lens (C) focuses an image of the input source (A) at the output. Assuming that the input (A) was a point source, then this arrangement produces an output image (D) that is likewise a point. Substantially all the incident light energy in the collimated beam is focused to point (D). The two lens collimating system shown produces a replica at the output (D) of a point source input (A), if there is no blockage introduced along the beam path. According to the invention, however, phase cancellation is introduced by placing a controllable liquid crystal along the beam path.

Figure 1B:
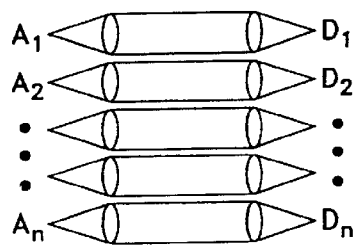
Figure 1C:
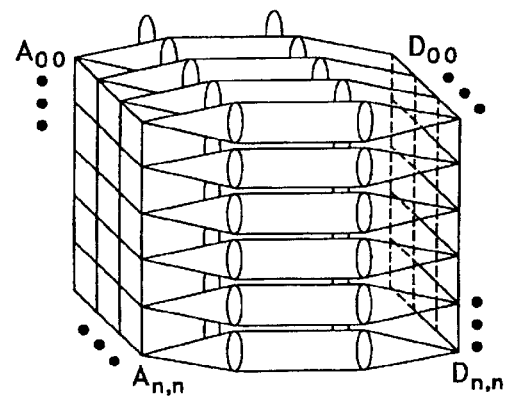

FIGS. 1(b) and 1(c) demonstrate a one-dimensional arrangement and a two-dimensional array of point sources, respectively. An exemplary one dimensional point source could be a line of pinholes in a screen backed by a diffuse light source. An exemplary two dimensional array could be provided by a sheet-like screen at the entrance with an array of pinholes to act as light sources. Similarly, the output or light collection point(s) can be limited to one dimensional or two dimensional arrays of points formed by pinhole or small diameter openings in an opaque screen.

As mentioned above, many other point applications are possible. For example, for a display application, each point can be a pixel light source. An array of optical fibers can be bundled and placed endwise such that the arrayed cores of the fibers act as light sources. The principles of the invention are described with reference to single points, but can be applied to a two dimensional array simply by repeating the individual elements as pixels in an array of sources, lens elements, liquid crystal phase control elements and light collection orifices.

In the simple one-pixel case, such as a single optical fiber application, point (A) in FIG. 1(a) can be an end of an optical fiber. The collimating lenses (B) and (C) can be conventional glass or plastic lenses or gradient index lenses (commonly referred to as GRIN lenses). Collection point (D) can similarly comprise a fiber end. In such a system, the light emitted from the fiber at point (A) is collected by the second fiber at point (D), provided that no obstruction is introduced in the light path. According to the present invention, a controllable obstruction is introduced in the specific form of a liquid crystal element operable to induce a phase variation resulting in interference.

Figure 2:
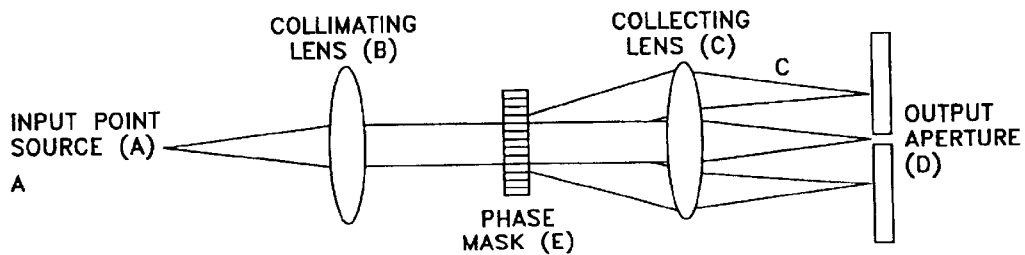
FIG. 2 is a schematic illustration of an optical control device according to the invention, shown for one point only.

The effect of phase variation can be seen in FIG. 2, wherein a phase mask grating (E) is shown placed in the light path between the collimating lenses associated with the inventions. If according to the illustrated structure, the phase mask (E) divides the light into two components, then interference between the components produces an interference pattern. The interference pattern produces an array of peaks and nulls where the waves from the plural components interfere more or less positively, or cancel one another. According to the invention, such a pattern is produced controllably, and is employed to separate the light spatially.

In the embodiment of FIG. 2, the spaced collimating lenses (B) and (C) could be at an indefinite spacing if the collimation is ideal, without changing operation, because the rays of collimated light would remain parallel. However, the phase mask or grating (E) preferably is placed in front of the second collimating lens at exactly at a distance equal to the focal length of the lens. The light is diffracted by the grating, and a diffraction pattern is caused by the light propagating forward.

One component of the interference produces peaks and/or nulls along the axial beam center line, namely on the zero order. Progressing divergently outwardly from the phase mask, and progressively greater angles relative to the center line, are nulls and peaks at the first, second, third and further orders, etc. The pattern of this interference forms a diffraction pattern of divergent rays. The second collimating lens (C) focuses the image produced by the phase mask onto a screen containing an aperture (D) for selectively passing only a given order of the diffraction pattern. Preferably, aperture (D) is an axial aperture and passes the zero order of the diffraction pattern and blocks the upper orders, which are focused on the screen containing aperture (D), but at a radial space out from the center line.

The zero order of the diffraction pattern produces the brightest peak, and accordingly produces the best contrast when the diffraction pattern is varied according to the invention, controllably shifting the light energy at the zero mode axial center line between its brightest peak and a substantially complete null.

The divergent diffraction pattern emanating from the phase mask is redirected by the second collimating lens (C) into parallel rays. As a result, the respective, zero, first, second, etc. orders of the diffraction pattern are directed into discrete areas of light then passed through the lens to become parallel beams because they all emanate from the focus of this lens. Only the zero order beam passes through the defined by the output aperture (D) and into the fiber or into another strategically placed destination such as a hole or sensor. The other light, namely at all the upper orders, is blocked by failure to align with the aperture (D). In the embodiment shown, the light signal is attenuated because part of the light energy is deflected from the zero order into higher orders. The proportion that is passed along the center line and focused to a point, versus the portion that is deflected into the other orders, is controllable according to a further aspect of the invention.

Assuming that the phase mask is a grating, the extent to which the phase mask can discriminate between the respective orders of diffraction peaks and nulls depends in part on the fineness of the grating. If the phase grating is relatively coarse, then the higher order diffraction peaks may pass closely along the center line of the optical system and thus reduce any contrast between the zero order and the first order, etc. If on the other hand the grating is very fine (i.e., has a small period between grating lines), a higher contrast device is possible.

According to the present invention, the desired effect can be achieved with a grating that is not unduly fine. The zero order spot or brightness peak in the diffraction pattern occurs along the center axis. The first order spot for such a grating occurs at a position $X \sim f\lambda/d$, where f is the focal length of the lens (C), $\lambda$ is the wavelength of the light and d is the distance between lines of the grating. If we arbitrarily choose $f=3$ mm, $\lambda=1.55$ μm, and $X=100$ μm (which is much larger than mode diameter of a single mode glass optical fiber) then $d=46.5$ μm. In other words, the phase grating needs to be about 20 lines/mm or finer, if the zero order and the first order of the diffraction pattern are to be at least 100 μm apart. Therefore, the grating does not have to be exceptionally fine to produce the desired effect.

In general, the amount of light that is distributed into various orders of the diffraction pattern can be calculated by taking the Fourier transform of the pattern. Thus for example if the pattern is a precisely sinusoidal phase grating, only the zero and the first order of the diffraction pattern can be expected to appear. Also, by using this technique, the diffraction patterns expected from other phase mask patterns can be calculated.

According to an inventive aspect, a controllable phase mask was desired. A controllable phase mask was considered using a liquid crystal material whereby, the phase characteristics are variable under electric control to change states between one switchable condition in which incident light was directed along the zero order of a controllable phase plate, and another switchable condition in which the incident light was directed elsewhere.

According to the invention, an electrically controllable device is provided, which functions as a controllable phase plate. This is accomplished using the controllable birefringence of a liquid crystal, rather than by altering the spacing of lines of a grating as the phase plate.

The invention preferably uses electro-optic materials, such as liquid crystals or other materials such as PLZT or lithium niobate or another material in which the phase retardation of light passing through the material can be altered in a controlled manner using external perturbation. The perturbation is discussed herein using an electric field as an exemplary sort of controlling parameter. It should be appreciated that there are other possible perturbing effects associated with thermal, mechanical, magnetic, optical and other variations besides the preferred electric field variation.

In the example of electro-optic effects, liquid crystals are anisotropic materials in which the phase retardation of light passing through a device comprising liquid crystal can be varied, controllably, as a function of the amplitude of an applied electric field. In a liquid crystal, application of an electric field varies the index of refraction for plane polarized components aligned to one of two orthogonal axes. The result of the change in index is a corresponding variation in the phase retardation or phase delay that occurs between light that is incident on the device versus light that passes through the device and emerges.

Phase retardation occurs when light traverses a medium having a given length of propagation path. The extent of phase difference is a function of the material dimensions, the index of refraction of the material, the wavelength of the incident light, etc. However, by controllably varying the index of refraction for one axis, as is possible using liquid crystal material, a differential phase retardation effect can be produced. The differential phase can be produced between components of incident light that align to the controllable axis, versus components that align to the uncontrolled axis that is orthogonal to the controllable axis. The differential phase being controlled also can be on the same axis, for portions of a device that are electrically controlled versus portions that are not controlled (or even portions subjected to different control amplitudes).

The differential phases are arranged to interfere, namely to be summed as separate sources. Interference peaks occur where the peaks in the summed phases align in phase. Nulls occur where the phases are 180 degrees out of phase, because positive peaks of one sum with negative peaks of the other, resulting in zero amplitude.

A simple example of a liquid crystal device for producing an electrically controlled phase shift according to the invention, is one based on nematic liquid crystal. An advantage of this material is that a phase shift sufficient to be used for controllable attenuation as described can be accomplished with a relatively low level of applied voltage because such liquid crystal material is readily deformed by the external perturbation.

Liquid crystals are birefringent, and the change in index with applied voltage occurs along a specific polarization orientation relative to the orientation of molecules of the liquid crystal. As a result, the electric field does not operate to produce a phase variation equally on both orthogonal polarization components. It would not seem to be possible to apply a liquid crystal in a straightforward manner to produce a useful phase variation for both polarization axes simultaneously (components aligned to $n_e$ and $n_o$ of the liquid crystal), and assuming arbitrary input polarization of the light, except. To usefully employ the electrically controllable birefringent axis $n_e$ of the liquid crystal, one would normally expect to need to specifically design the optical system for polarization insensitivity, e.g., either to exclude light that is not plane polarized to the controllable axis, or to divide, reorient and recombine the polarization components of the incident light to align to the controllable axis. Such a device is not preferred because it may involve excluding a large part of the incident light (the portion that is not polarized to align to the controllable birefringent axis), or alternatively, separating and reorienting polarization components in a way that adds complexity and expense to the optical system.

The elementary operation of an electrically controllable liquid crystal can be appreciated by considering plane polarized light, impinging on a liquid crystal device. A liquid crystal device can be manufactured, for example, with nematic liquid crystal, oriented using a surface configuration that forces the "director" or reference direction be parallel to a given line, such as the y-axis as shown FIG. 3. It is sometimes said that the slow axis of the crystal is oriented to a brushing direction.

The light is to propagate along a z-axis in FIG. 3. The crystal molecules or elements down through the crystal material, align with the director absent other influences. Therefore, absent any perturbation, the molecules or elements have a regular orientation as shown on the left side of FIG. 3.

However, by applying an electric field along the z-axis, which can be done using conductive transparent electrodes that are deposited on inner surfaces of the cell, the director effectively can be reoriented. This is generally not uniform. Because of the rigid boundary conditions at the brushed surface, the molecules spaced away from the surface, and in the middle of the cell, are more easily distorted and those at the surfaces are less easily distorted, which is shown on the right side of FIG. 3. This produces a non-uniform director distortion across the cell such that the angle of deviation $\theta$ away from the x-y plane changes as a function of z.

In the geometry being discussed, the tilt $\theta(z)$ is confined to the y-z plane. The distortion from the original orientation depends on the magnitude of the applied electric field and is shown schematically in FIG. 4. The variation of $\theta(z)$ due to the voltage-induced deflection is less at the surfaces and greater proceeding inwardly away from the surfaces. Thus, $\theta(z)$ is different at different points, and the variation is not linear. The variation and its non-linearity present no problems, however, because what is important is the total phase retardation. Deflected molecules or local elements may have a higher or lower index depending on their position in view of the variation in deflection proceeding inward from the surface. However the total phase shift through the crystal is the sum or the integrated total through all the elements encountered by the light passing through. Such liquid crystal structures can be arranged in zones, as shown in FIG. 4, each zone being controlled independently.

According to the present invention, a liquid crystal as described, or a structure having similar attributes, is used in the position of the phase grating discussed above with respect to FIGS. 2 and 3, to modulate the phase of a source of light contributing to an interference pattern, such that the pattern is made adjustable. If the light incident on a liquid crystal in the position of the phase grating in FIG. 2 has at least a component that is polarized parallel to the director orientation of the liquid crystal, then application of an electric field to reorient the director changes the index of refraction for that polarization component. This adjusts the phase of that component when emerging from the liquid crystal and can reposition peaks and nulls of the interference pattern as a result. That is, for one of two orthogonal polarization components, it is possible to use a liquid crystal to modulate the phase of the light traversing the liquid crystal, specifically for the polarization component that is parallel to the director axis.

Thus according to the invention, plural phased light components are caused controllably to interfere, while effectively tuning the phase retardation of light through a device used as a controllable phase grating, and thereby altering the diffraction pattern produced. Also according to the invention, the diffraction pattern is normally directed onto a field having one or more positions where the light or its signal are passed (e.g., by having an aperture or a glass fiber end or a light sensitive sensor, for example), versus one or more other positions where the light or its signal are blocked. By altering the phase retardation of the controllable phase grating, the invention permits light energy to be directed to one or another of the positions.

As discussed above, it is very desirable in any practical device to be polarization insensitive, preferably in a manner that does not require splitting diverse polarization components and recombining them in manner that establishes uniform plane polarization characteristics.

Figure 6:
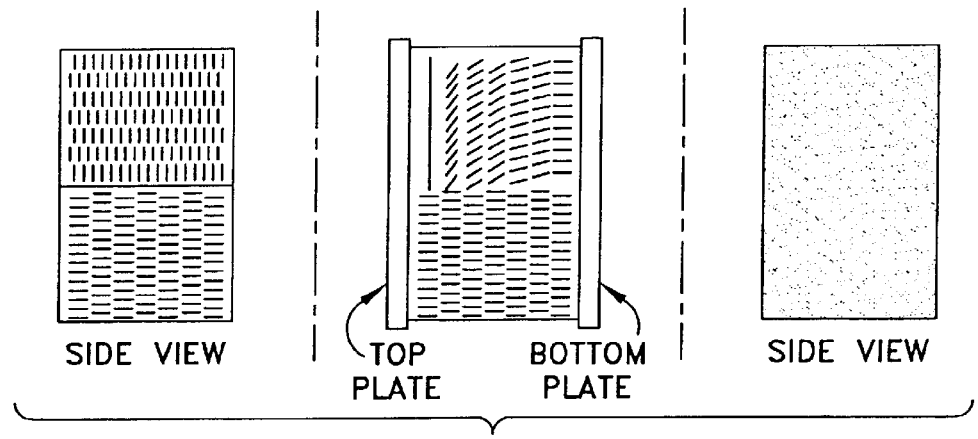
FIG. 6 is a three-view composite as in FIG. 5, wherein two distinct zones are provided, of different relative alignment.
Figure 7:
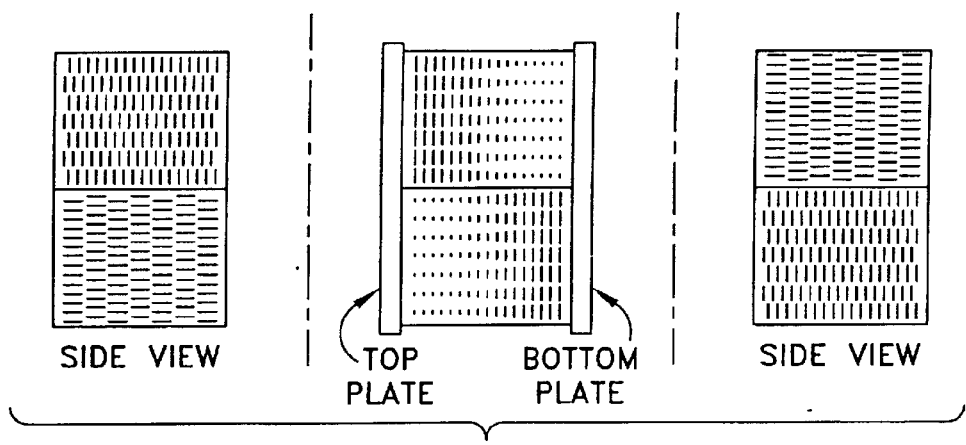
FIG. 7 is a three-view composite as in FIGS. 5 and 6, showing an alternative zone arrangement comprising zones having molecules with different mutually perpendicular orientations.

FIGS. 5–7 show some simple examples of how such a device can be embodied by providing zones of liquid crystal material with different director orientations. Two superposed zones are shown in the examples, but an example could have any number of zones or regions having one of two director orientations and positioned in interleaved order. These structures can produce polarization insensitive results.

When birefringent materials are used in a phase mask as described, and in particular to make a controllable attenuator according to the invention, the controllable attenuation is polarization dependent because phase modulation using a birefringent liquid crystal is specific to one of the two orthogonal crystal axes. The phase retardation can be tuned for only one of two orthogonal polarization components of the light. Nevertheless, the device can be structured so as not to be polarization dependent, for example by providing areas that operate equally and concurrently, each handling one of the two orthogonal polarization components. Some possible orientations of liquid crystal directors are shown in FIGS. 5–7. In these examples there are two zones shown in each case. It is likewise possible to use a larger number of alternating zones instead of only two.

Figure 8:
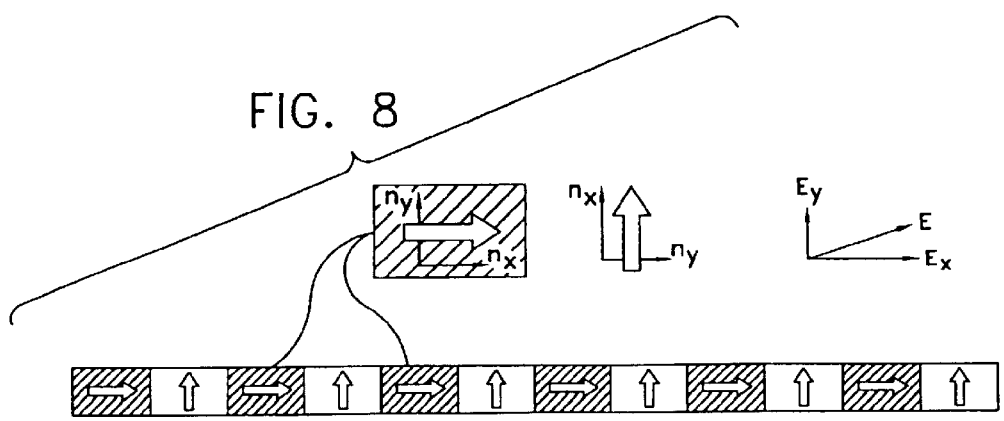
FIG. 8 is a schematic illustration of a linear array of domains having orthogonally oriented directors of two types that are arranged in alternating order.

Operation can be appreciated considering the graphic example shown in FIG. 8, wherein the arrows at each segment are considered the director of the local strip or block of liquid crystal material. First, for example, if the incident light is plane polarized vertically, then the incident light is aligned by polarization to the director of one of the two types of block defining zones. If the incident light is plane polarized horizontally, then the light is aligned to the director of the other type of block and the next adjacent zones.

Both zones are liquid crystal, although in this example they are interleaved in perpendicularly aligned sets. As discussed, it is an attribute of liquid crystal that the index of refraction is electrically controllable on one axis and on the perpendicular axis the index of refraction is fixed. For any single zone (arbitrarily named as the "first" zone), a phase difference arises if a voltage is applied to the liquid crystal, namely a phase difference between the polarization component along the director, which is subject to the electrically controllable phase retardation, and the polarization component that is perpendicular to the director and thus is subject to a fixed phase retardation regardless of control voltage.

In FIG. 8, if all of the zones are subject to the same control voltage, and the foregoing results accrue for the "first" zone, then the same results will also occur for the adjacent zones, except that if the first zone controls the vertical whereas the horizontal is fixed, then the second zone controls the horizontal whereas the vertical is fixed. The point is that by representing both polarization components in both zones, the overall device is made polarization insensitive. If the first zones have controllable vertical and fixed horizontal, and the second zones have controllable horizontal and fixed vertical, and the zones are all subject to the same control perturbation, then the polarization components are all handled in the same way.

Stated in a more mathematical way, the phase difference between two neighboring zones is $d(n_x-n_y)2\pi/\lambda$ for the chosen polarization, and $d(n_y-n_x)2\pi/\lambda$ for the orthogonal polarization. If the phase difference obtained by a given voltage is $\phi$ for one polarization then (assuming that the same voltage is applied uniformly across the device) the phase difference for the orthogonal polarization is $-\phi$. If two parts of light, with a phase difference $\phi$, are brought together and interfere with each other, the resulting intensity at zero order is given by $\cos^2(\phi/2)$. This function is insensitive with respect to the sign of phase difference $\phi$. Therefore, the device is polarization insensitive.

Any arbitrary polarization of incident light can be decomposed into field or vector components along perpendicular x and y axes as shown in FIG. 8. Therefore, the device in FIG. 8 is polarization insensitive for all input polarizations. Generally stated, for any arbitrary voltage across the liquid crystal, for any relative orientation of the incident light to the physical structure, including the orientations shown in FIGS. 5 through 8 assuming two paired zones, interleaved zones or the like, the phase difference is simply N and −N for the two orthogonal polarization components. The devices are insensitive to polarization.

According to an inventive aspect, the concept discussed as is applied to an arrangement in which the director is not strictly arranged in zones but in fact is randomized. This case is schematically shown FIG. 9. For simplicity, the drawing shows a series of equally sized domains. Each domain has a director shown by an arrow, and is construed to contain a controllable birefringent material such as a liquid crystal, whereby one orthogonal polarization is subjected to a variable index of refraction and the other polarization is subjected to a fixed index. Assuming that for each zone having a given director orientation, there is another equal zone having a director orthogonal to the given director orientation, then the device would be functionally the same as FIG. 8. That is, for sets of birefringent zones in which there is equal representation of two orthogonal directions, incident light of any and all arbitrary polarizations is treated the same. The device is polarization insensitive.

Figure 9:
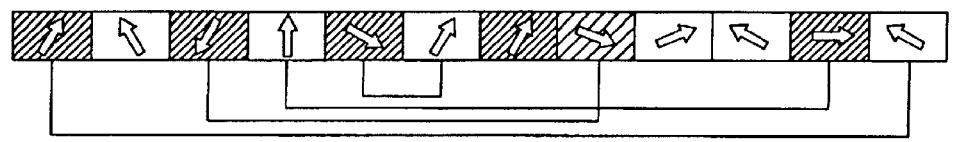
FIG. 9 is a schematic illustration wherein pairs of orthogonally oriented directors are randomly oriented and arranged in random order in a linear array of equally sized domains.
Figure 10:
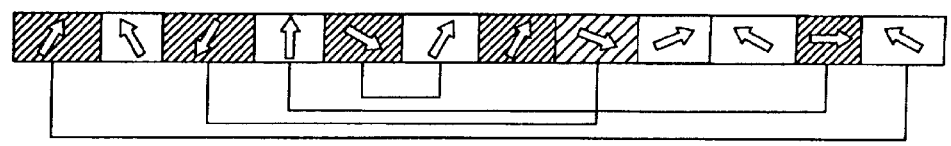
FIG. 10 is a schematic illustration corresponding to FIG. 9, wherein the domains are of random size.

For purposes of illustration, the director is shown for each zone in FIG. 9, and each director is paired by a bracket with another director and another zone that is orthogonal to the first director and zone. It is possible to show that if there are a large number of domains and the directors of the domains are distributed randomly, then the device is polarization insensitive because it is possible to pair domains of any director orientation with other domains of orthogonal orientation. The device can produce a variable interference pattern as discussed, wherein the zero mode or axial direction can be varied to become an interference peak or a null or any attenuation between them, for all polarization conditions.

The zones in FIG. 9 are of equal size. If there is a random distribution of director orientations and also a random distribution of domain sizes, the same considerations remain applicable. So long as a statistically large set of domains and orientations are represented, it will be possible to pair any given domain by director orientation and size, with another that is equal bur orthogonal to the first. The result is a tunable diffraction pattern attenuator structured as shown in FIG. 2, with a statistically large, number of randomly oriented domains of random sizes, at least within a range. In short, the device operates as a polarization insensitive attenuator.

Thus according to an inventive aspect, the controllable phase mask (E) used as the phase interference element according the invention as shown in FIG. 2, has a plurality of zones wherein the liquid crystal material is preferably the same material or otherwise has the same extent of birefringence, but the directors of the zones are oriented randomly.

In the foregoing analysis, one can note that the spacing between two paired regions with orthogonal director orientations may be unequal (i.e., the members of one pair may be closer together than the members of another pair. The spacing between the phased sources affects the nature of the diffraction pattern that results from interference between the sources. However, that matter is of no moment according to a preferred embodiment, because the aperture at the output device is aligned to the centerline, and only the zero mode of the diffraction pattern is used to couple or decouple light energy to the output aperture. The zero mode is the central, potentially-brightest peak in the diffraction pattern and is not affected by rotation. However, by varying the phasing of the numerous randomly oriented zones or domains, by applying a control voltage commonly to all of the zones or domains, the zero mode in the interference pattern becomes a peak or a null, or is controllable to a level between the two.

Insofar as any two paired orthogonally oriented zones have non-uniform spacing, the result in the diffraction pattern is that the higher order spots in the pattern become more blurred. Insofar as the rotational orientation of the directors of the zones varies, the diffraction pattern becomes a series of concentric rings. Nevertheless, the zero order remains controllable and the device functions substantially to shift a portion of the light energy between the zero order central spot in the diffraction pattern and areas spaced outwardly from the center.

As a result of the foregoing structure, the intensity of the peak or null at the central zero order spot in the diffraction pattern is made to be a function of the birefringence of the phase mask. For liquid crystal or similar materials, the birefringence is electrically controllable. Therefore, in combination with an aperture mask that screens off the central zero order spot, the invention provides an electrically controllable attenuator.

Analysis shows that the intensity of the zero order spot scales in a polarization independent manner as a cosine square function of the birefringence of any one element. The contrast of the device can be made very high if the birefringence in all portions or zones of the element is essentially equal. It is also desirable to minimize variations in thickness while providing a highly random or at least pseudorandom distribution of director orientations. If these criteria are not met, then some degradation of the contrast (difference between highest and lowest light level) can be expected.

In illustrating and discussing the invention, a one-dimensional line of zones or domains was shown for purposes of illustration. The same considerations apply and can also be graphically shown or represented by equations concerning an X-Y array of positions on a two dimensional element having a given thickness along a center axis.

According to further aspects of the invention, in order to provide an electrically controllable attenuator as described, and in particular to provide a polarization insensitive phase mask, a controllable phase mask is provided with a substantially random or pseudorandom distribution of director orientations in zones or domains over a surface. The domains have an equal value of birefringence (oriented randomly) that is controllable commonly, for example by a commonly coupled electrical control voltage.

According to an inventive aspect, there are two related versions of randomly oriented liquid crystal domains that permit polarization insensitive attenuation as discussed above. According to one approach, the domains have zero birefringence (i.e., equal indices along their orthogonal axes) in the absence of an applied electric field, and have increasing birefringence (increasingly unequal indices) as a function of applied voltage. According to another approach, the birefringence of the domains is non-zero in the absence of an applied electric field, and is reduced (the indices are brought nearer to equal) as a function of applied control voltage.

Depending on the material and physical attributes of the controllable phase mask, it is possible that the output of the devices as an attenuator may have several peaks and nulls over a given range of control voltage. This can occur, for example, if the range of phase retardation produced on the controllable axis of the phase mask over the given range of control voltage, is greater than a full period.

A goal for production of the phase mask is to construct a liquid crystal structure that produces a high contrast diffraction pattern, and thus can be used as an efficient light attenuator that is controllable by application of an electric field. The device should be uniform as to its phase retardation characteristics across the surface of the device, both in the absence of an applied electric field and (at a different phase retardation value) upon application of the field. Advantageously, the device should be finely and continuously controllable to establish a desired degree of diffraction, in a reversible manner without hysteresis. Although substantial uniformity is desirable as to thickness and birefringence when perturbed or not perturbed, a high degree of randomness is desirable as to director orientation.

Assuming some birefringence in the absence of perturbation, the attenuator of the invention can be arranged either to minimize attenuation when perturbed or when not perturbed, and thus to provide an output spot that is bright or dark accordingly. That is the device can produce attenuation due to light diffraction in the absence of the field, and can become clear (minimum attenuation) in the presence of a field.

Operation of the attenuator as described has functional similarities to operation of a polymer dispersed liquid crystal device (PDLC). However the invention operates at quite low control voltage by comparison, due to its different operational principles. A typical operating voltage can vary, for example, by only a few volts with saturation of electro-optic properties occurring at voltages below five volts. The attenuator of the invention also operates in a way that preserves more of the incident light energy than devices that employ polarization selective steps effectively discarding one polarization orientation while employing another. The invention is polarization insensitive and uses both orthogonal components of arbitrarily polarized input light.

According to further aspects of the invention, a process is disclosed for producing a phase mask as described. According to a preferred example, an electro-optic liquid crystal cell is provided. It should be understood that although electric perturbation types are of interest, it is also possible to use other forms of perturbation such as mechanical variations, magnetic, thermal, etc. An exemplary phase mask element comprises indium tin oxide coated conductive glass.

According to another inventive aspect, the surface properties of the element are controlled so that the surface director is randomly oriented at one or both surfaces in the presence of the perturbing field (preferably an electric field). In the absence of the electric field, the structure is chosen to be homeotropic, and in that state the director field is substantially parallel to the light propagation direction. The liquid crystal used is one with negative electric anisotropy in one embodiment.

Surface preparation is an important part of the process of producing high contrast, namely a highly diffracting structure in the presence of an applied field, that also is non-diffracting in the absence of the field. Alternatively, it is also possible and may be desirable to produce a structure having the inverse characteristic, namely being diffracting when unperturbed rather than vice versa.

According to one technique, a random structure is produced, and the surface is coated with a homeotropic surfactant so that in absence of the field, vertical alignment is obtained. When an electric field is applied, the molecules tilt towards the surface to produce a random orientation with substantially the same phase change along a unique axis of the domain determined by the plane formed by the tilt direction of that domain. This direction is randomly oriented for different domains, but the domains have substantially the same value of the electrically controllable birefringence.

An object is to provide a surface that can produce random orientation when an electric field is applied to the liquid crystals, but at the same time has the desired properties, allows deposition and surface bonding of the homeotropic alignment layer, and has no birefringence except upon application of a control field. To consider the desired liquid crystal alignment, the surface topology can be compared to the topography of land. A randomly non-uniform surface is comparable to a surface with variations in elevation, perhaps comparable to hilly terrain. This metaphorical surface of varying elevation carries distributed standing trees, which are springy and represent vertical structures corresponding to the directors or orientations of the liquid crystal molecules. In this analogy, when a perturbing electric field is applied, the molecules tilt over downwardly and lay in the valleys, producing a random two-dimensional orientation when perturbed but not when unperturbed. When the perturbation is lifted, the trees stand back up again vertical.

As another analogy one can consider that unperturbed liquid crystal molecules are aligned with directors like standing blades of grass on a lawn, presenting their ends to the direction of light propagation. The perturbing field presses the blades down like an air current that is more or less strong and pushes the blades over more or less flat as a result. The blades lay over in random directions relative to their bases, producing random orientations of birefringence. The extent of birefringence, like the length of the grass blades, is substantially equal, regardless of orientation.

Consistent with such analogies, the extent of variation in elevation or the height of the standing blades and the depth of the surface roughness may be small. However, the birefringence of the liquid crystal is the essentially of the same magnitude over the surface, which is different when perturbed versus unperturbed. In the perturbed state the molecules become randomly oriented as to their directors or as to their slow and fast axes, $n_o$ and $n_e$.

The goal of producing a random structure was accomplished by using a polymer with siloxane polymer backbone. A commercial polymer called GR650F (available from TECHNEGLAS, INC., Perrysburg Ohio) was used. The choice of this polymer is made only for illustrative purposes and other similar materials of a type used for producing conventional liquid crystal products are also possible. The GR650F polymer produces advantageously produces a thin clear film when deposited from a solution for example by spin coating. To provide for surface scattering, very small glass particulate material (glass powder) was added, which also has the appropriate surface chemistry to allow the homeotropic agent to bond to the surface. The powder used in the test example was Cab-O-Sil (available from Cabot Corporation).

In particular, a solution of 2% GR650F and 2% L-90 Cab-O-Sil, all by weight and in an ethanol solvent, was mixed to produce a milky stable solution which was first deposited on indium tin oxide (ITO) coated glass plates. This coating was dried at about 120C. degrees for 30 min and then subjected to oxygen plasma etching. This process burned away the organics and produced a scattering glassy surface on top of the ITO coating.

This surface was coated with 0.5–5% (by weight) ethanol solution of Octadecyltrimethoxysilane (available from Aldrich Chemical Company #37,621-3) or equivalent chemical for inducing homeotropic characteristics. This was baked at 120C. degrees for about 30 minutes. The plate was then assembled into a liquid crystal cell by methods commonly known in the art and filled with negative dielectric anisotropy material. An exemplary such material used was ZLI 4302 (available from Merck).

It should be understood that there are other methods that will be apparent to those skilled in the art whereby such an optical element with a random scattering surface can be provided, and which according to the foregoing disclosure has vertical director alignment in the absence of a perturbing field and in the presence of the field produces a scattering effect by corresponding alignment of its structures. For example, another method of making the desired structure is by mixing 2% GR650F polymer, by 2% of fine glass powder such as L-90 or Grade PTG or Grade EH-5 and 2% Octadecyltrimethoxysilane, all by weight and in an ethanol solvent. This solution is then spun onto a glass plate, for example at about 2000 rpm or by another similar process to make a thin coating. The coating is dried at about 140C. degrees and assembled into cells as described above and filled with liquid crystal with negative dielectric anisotropy.

The inverse structure described above can likewise be produced by similar means, except that the alignment of the liquid crystal molecules is arranged to be random in the absence of the perturbing field and to tilt toward vertical in the presence of the field when an electric field is applied. In this case a positive dielectric anisotropy material may be employed.

As stated above, the designation "vertical" and similar directional or spatial terms, are used to assist in an understanding of the invention but are not limiting in an absolute sense. The term "vertical" as used in the preceding paragraph, for example, denotes an orientation that is protruding or endwise or normal (standing) relative to a general plane defined by a surface. The term "vertical" in this context does not require that the associated general plane have any particular orientation, whether horizontal or otherwise, but is used for convenience in explaining relative orientations.

A simple example in accordance with the invention is to produce a homogeneously aligned sample by avoiding conventional unidirectional rubbing of the sample and similar steps. Conventional rubbing is considered advantageous in liquid crystals so as to provide parallel rubbing or abrasion scratches or valleys that function to align certain of the crystal molecules, causing other molecules to assume the same alignment. According to the invention, in the absence of rubbing or other alignment steps, similar production steps can produce randomly-oriented domain structures. Alternatively, rubbing or abrasion steps the specifically produce random orientations in localized areas, can be employed, such as agitation with a volume of particulate abrasive, particulate blasting or the like.

Application of an applied field causes the molecules to tend to line up with the field, which can increase or decrease the amount of birefringence, thereby providing a controllable amount of attenuation using the phase mask and aperture arrangements of the invention, preferably but not necessarily also including focusing optics as in FIG. 2. Another example of producing random structure would be for example, by using the example illustrated above but not coupling the surface with a homeotropic alignment layer.

The invention was demonstrated using the procedures outlined above by first producing a scattering surface and then coating the surface with a homeotropic alignment agent. The Liquid Crystal ZLI 4302 (available from Merck) was used for the examples that produced the following results. This material has a negative dielectric anisotropy.

Figures 11A, 11B, 11C:
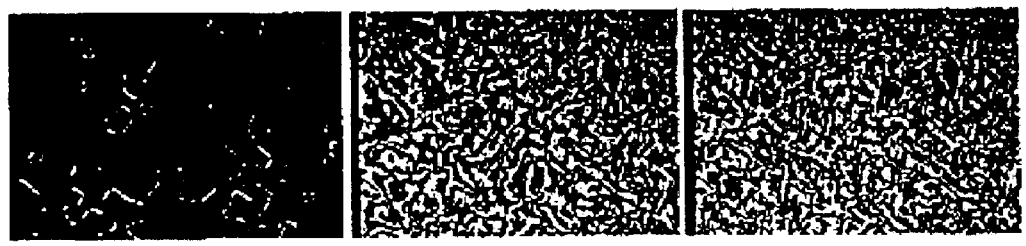
FIGS. 11a, 11b, 11c are microphotographs showing a phase mask element according to the invention, wherein a control voltage is not applied (FIG. 11a), applied at part scale (11b) and applied at higher amplitude (11c).

FIGS. 11a–c are microphotographs that show the appearance of the sample when backlighted by placing the sample between cross polarizers. (There is no collimating or focusing element used for this depiction, which shows simply how the domains can be randomized.) The sample is shown as it appears with and without an applied electric field, viewed as backlighted, and along a line normal to the planar surface of the sample. In the absence of the applied field, the sample appears black, which is due to the fact that the molecules are vertically aligned for the most part, except for the presence of a few areas in which the molecules are anomalously tilted. In this geometry, because the light propagates parallel to the director axis, the sample exhibits no birefringence. There is no phase interference activity. The sample appears black, which is to say that little or no light is transmitted directly through the sample on a line normal to its plane. When an electric field is applied however, the formerly-endwise (or "vertically") oriented molecules tilt towards the plane of the glass, by a degree that varies as a function of the amplitude of the control voltage. However, the molecules tilt in random directions. The control voltage causes the material to become birefringent, with the directors of the molecules being oriented randomly. The extent of birefringence is tunable with adjustment of the control voltage.

Thus the application of the control voltage causes randomly oriented differential phase retardation, namely between the polarization components of the incident light that happen to be incident on randomly oriented molecules that have their fast and slow axes oriented in the required direction. The incident light can have any arbitrary polarization mix or can have any specific plane polarization orientation, which factor is irrelevant to operation of the invention. When a control voltage is applied to this embodiment, the controllable phase mask of the invention and its randomly-oriented birefringent directors, produces differential phase retardation of polarization components at any and all orientations. Effectively, the phase mask produces a large number of paired sources of light energy that are phase retarded by different amounts.

The phase retardations fall substantially into two specific values, namely the phase retardation of the birefringent material along its fast and slow axes, because all portions of the phase plate are subjected to equal perturbation (the same control voltage). The control voltage can vary the difference in phase retardation by controlling the amount of birefringence.

The difference in phase retardation produces interference. Such interference can produce peaks and nulls in various directions, but by selecting the zero order, namely by directing the output into an axial or centrally placed aperture, only the zero order beam is selected and only the selected beam is affected by the value of the phase difference between two sources. The "two" sources are the pairs of all the zones with orthogonal orientations of the director, which are randomly oriented (and thus polarization insensitive) and are summed by operation of the device as shown.

Figure 12A:
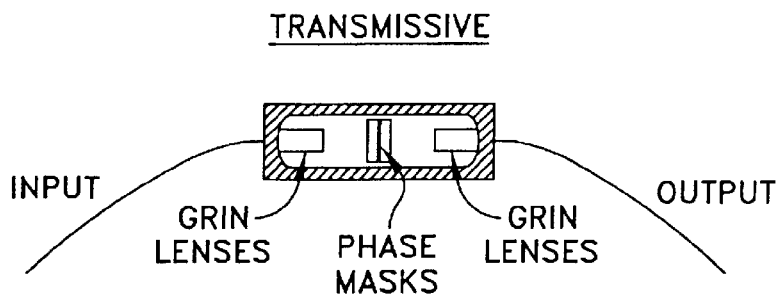
FIGS. 12a and 12b are section views showing optical power limiters according to the invention, in transmissive and reflective embodiments, respectively.
Figure 12B:
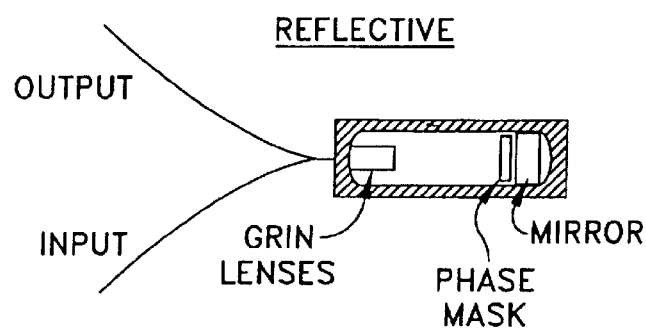

The foregoing physical layout of the device, and the electrically controllable random phase plate as described, are useful together to provide an optical attenuator. The invention was demonstrated with an optical fiber as a point source of light and a graded index (GRIN) lens as a light collimator. A randomly aligned nematic liquid crystal sample was used as a means of varying and controlling the phase as described. As shown in FIGS. 12a and 12b, this arrangement is applicable to both transmissive and the reflective geometries for an optical attenuator.

The optical system used to obtain the experimental results, which follow, were obtained by using a commercially obtained dual collimator from CASIX, Inc. (Fujian, China), which allows convenient use of the reflective geometry. The use of the dual fiber collimator is advantageous because it requires only one lens to make an optical attenuator. The random phase plate was made as described above except with a reflective gold electrode on one side for a reflective geometry. The collimated light passes through the sample, is reflected by the gold mirror electrode, and passes back through the sample and the collimator to be collected by another fiber as shown in FIG. 12b.

Figure 13:
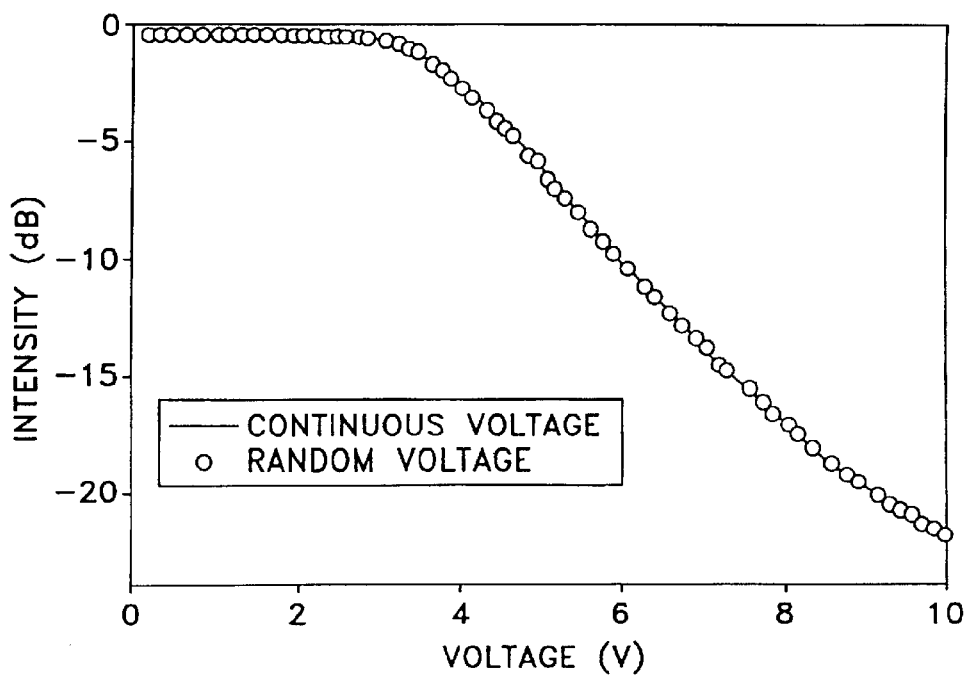
FIG. 13 is a graphic plot of output intensity versus control voltage according to an exemplary embodiment of the invention.

The optical attenuation performance measured at a 1550 nm wavelength for a 3.0 micrometer sample is shown graphically in FIG. 13. These measurements were taken using a duel fiber collimator. The output light amplitude was measured using an optical power meter. The applied electric field was switched, using a 1 kHz square wave. For the plotted results shown, the zero dB level corresponds to the reflected light without the sample in place.

The results in FIG. 13 show that it is possible to attenuate incident light by as much as −22 dB using the electro-optic controllable birefringent element described. The results also show that the extent of attenuation (and the output light level), is smoothly controllable by adjusting the amplitude of the electric field.

FIG. 13 actually contains two sets of data. The solid line (which is substantially obscured by the dots) represents light measurements when continuously changing the applied voltage in step increases from the previous value. The dots represent the light measurements when randomly selecting and applying different a voltage value and measuring the resulting level of attenuation. The rather precise overlap of these two sets of data shows that there is no substantial hysteresis in the response, which is another advantageous aspect of the invention.

Figure 14:
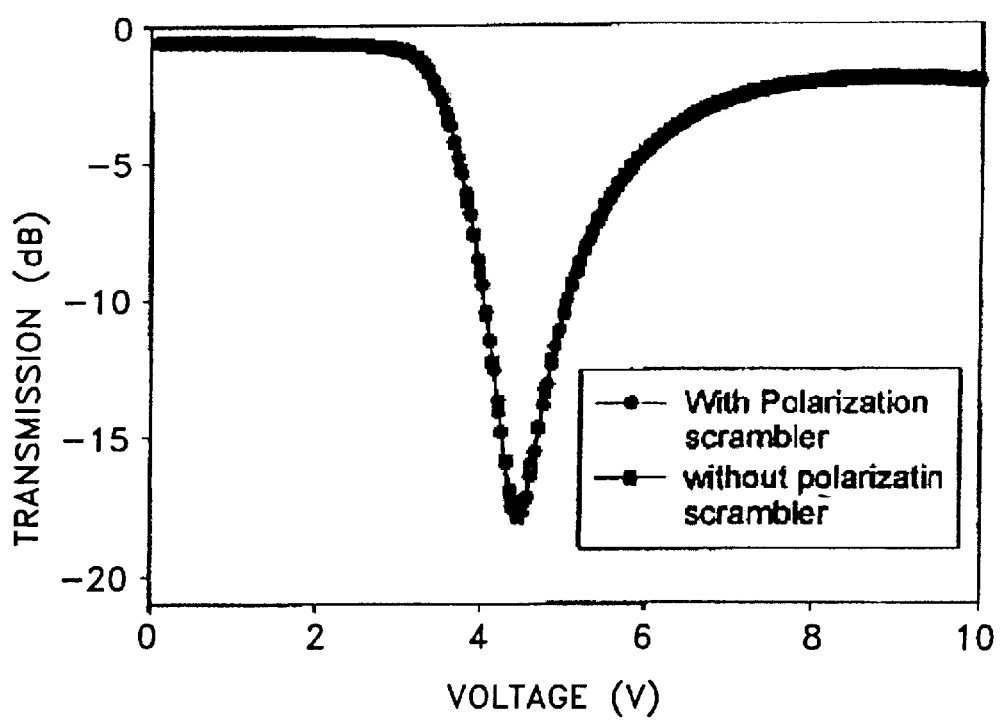
FIG. 14 is a graphic plot of output intensity versus control voltage under varying polarization conditions.

Additional tests and measurements were undertaken to determine and confirm the polarization independence of the device, and are shown graphically in FIG. 14. The polarization independence of the structure was verified using light whose polarization was varied as a function of time so that incident light with different polarization states was passed (or not passed) by operation of the sample.

A random polarization generator was provided, capable of generating all states of polarization in a steady state or a changing random sequence. The results of these measurements are shown in superimposed plots of dots and squares. The plots overlap precisely, showing that the device had no detectable polarization dependence.

Figure 15:
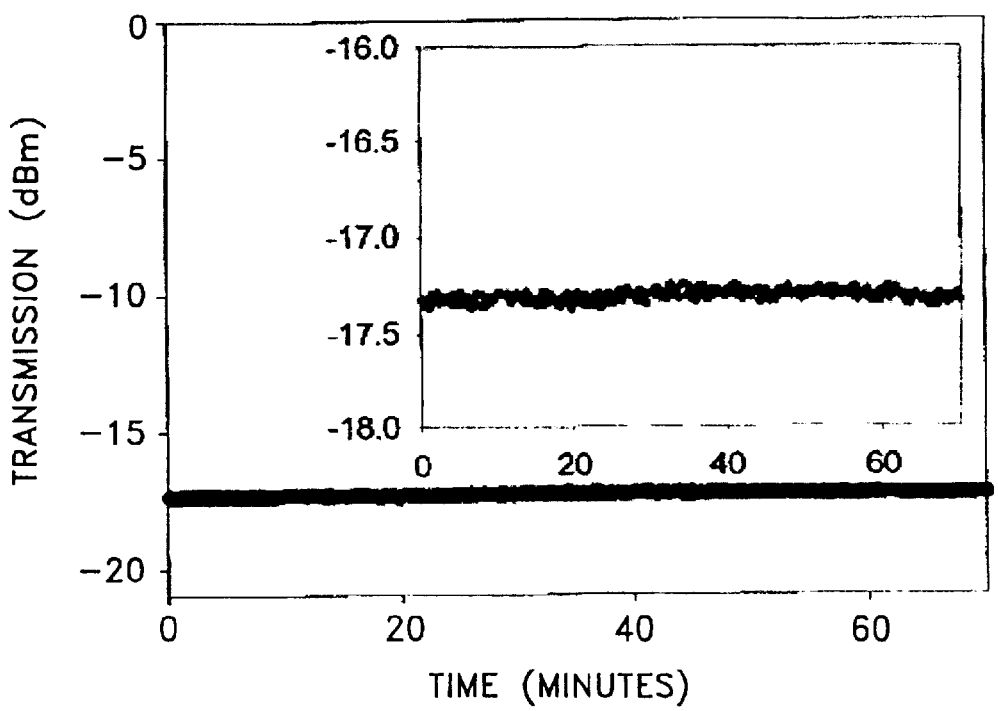
FIG. 15 is a graph of output intensity versus time, including an inset having enlarged scale, showing exemplary minimal drift in output level over time.

The invention was further tested to assess long term stability, the results being shown in FIG. 15 over a test period of about an hour. This test consisted of attenuating the signal to a predetermined value and monitoring the variation in transmitted light level as a function of time. Minimal drift was observed, estimated at about 0.2 dB, which is comparable to the variability of the input power level.

Figure 16:
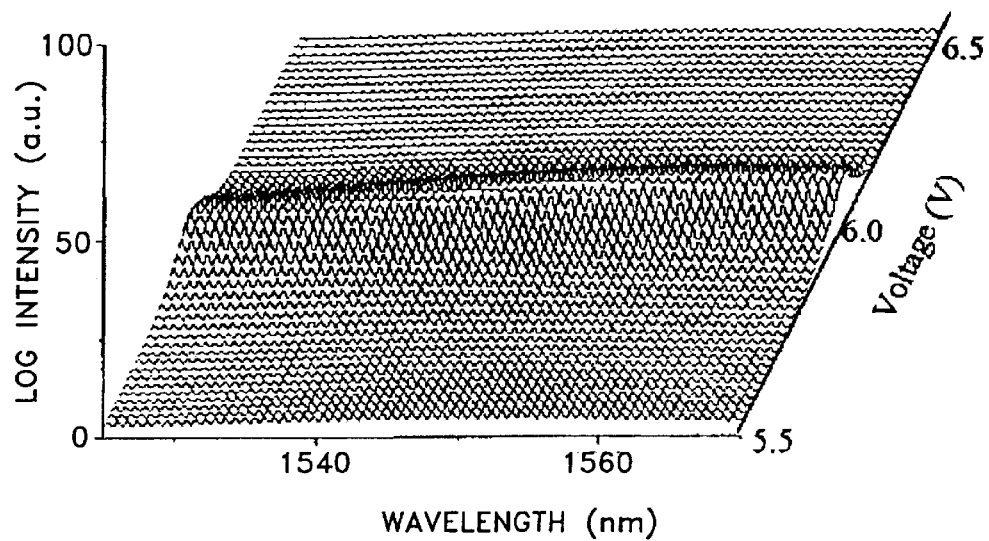
FIG. 16 is a perspective graph of output intensity versus control voltage over a range of wavelengths.

FIG. 16 demonstrates that the attenuator of the invention is wavelength dependent to an extent, which should be expected because the attenuator essentially relies on producing an adjustable interference pattern by setting a particular differential phase retardation. These are wavelength dependent parameters. However for an operating window of a typical device, such as a 40 nm band centered at 1550 nm, the wavelength dependence is manageably small, and can be estimated by considering that the phase change in the operating range is expected to change by about 2.5%. To measure this effect, the optical system described with respect to FIG. 12b was used with a broadband light source to determine the wavelength characteristics of optical attenuation. Different wavelength scans and different control voltages were applied to the attenuator, with the experimental results shown in FIG. 16.

Figure 17:
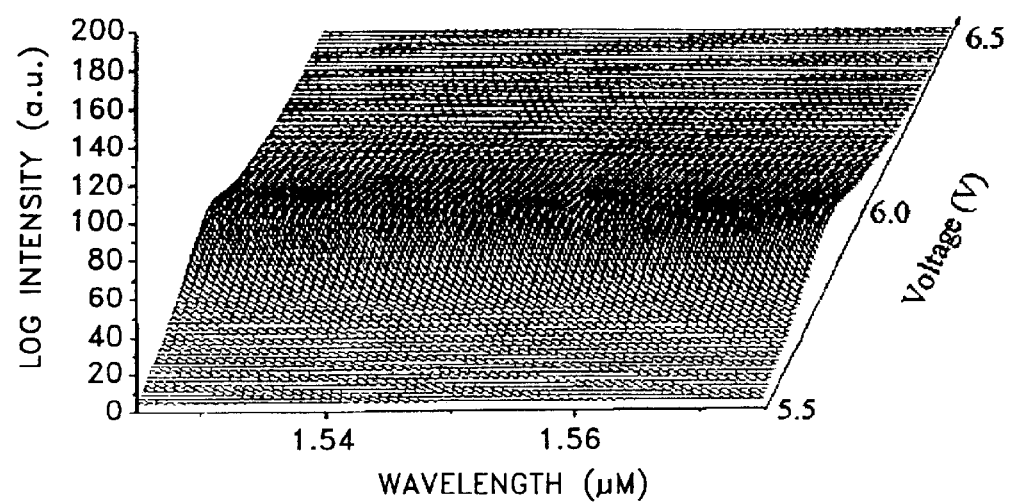
FIG. 17 is a perspective graph showing theoretical expectations for the range of data shown in FIG. 16.
Figure 18:
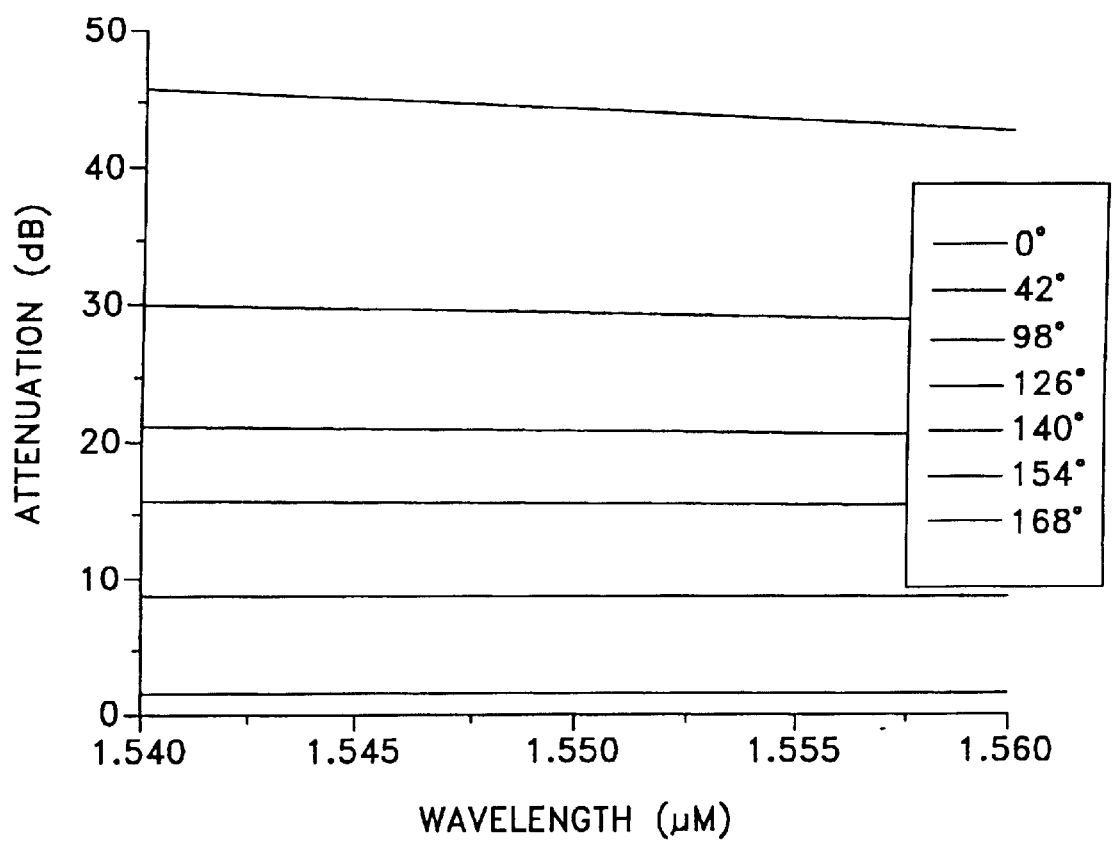
FIG. 18 is a graph showing theoretical attenuation level versus wavelength according to an embodiment of the invention.

A wavelength dependent oscillation was observed for the data, which is believed to have resulted from the fact that no anti-reflective (AR) coating was applied to the front surface of the device. To confirm that this was the case, simulations were run, the results being shown in FIG. 17. The simulations were based on the known thickness of the glass and the theoretical mathematical model discussed above, which indicated that the expected attenuation should be a cosine square function of the birefringence. The simulation and the observed results were similar, as shown, which suggests that application of an AR coating on the front surface should produce results more nearly as shown in FIG. 17. FIG. 18 shows the expected low wavelength dependence if AR coating is used.

The invention has been explained with respect to a number of specific examples. With the benefit of this disclosure, it should be apparent that there are variations from the disclosed examples that are also operative. Such variations are likewise a part of this invention. Reference should be made to the appended claims rather than the discussion of specific examples, to determine the scope of the invention in which exclusive rights are claimed.

We claim:

1. An optical device, comprising:
an optical element to be placed along a propagation path of light, the optical element defining a plurality of individual domains forming local parts of an area of the optical element such that at least more than two of the domains intersect part of the path of the light;
wherein each one of said domains has optical properties that can be different along two mutually perpendicular axes, said two axes for each said domain defining a given orientation of said domain;
wherein the given orientations for said domains vary across the area of the optical element such that any first one of said domains can be paired with a second one of said domains wherein the optical properties of the second one of said domains are substantially equal to the first one but are orthogonal to the first one.

2. The optical device of claim 1, wherein the optical properties for the two mutually perpendicular axes in each said one of said domains are substantially equal for at least one of the two mutually perpendicular axes for all said domains.

3. The optical device of claim 1, wherein said first one and second one of the domains that can be paired have substantially a same size.

4. The optical device of claim 1, wherein the optical element comprises a birefringent material subdivided into said domains such that the given orientations are defined by orthogonal fast and slow axes of birefringence.

5. The optical device of claim 4, wherein the retardations across said domains are controllable.

6. The optical device of claim 4, wherein the birefringence across said domains is substantially equal.

7. The optical device of claim 1, wherein the domains are randomly sized and randomly oriented across the area.

8. The optical device of claim 4, wherein the birefringent material comprises a liquid crystal material, and the liquid crystal material has at least two different director orientations at right angles to one another and at a controllable angle to a light transmission axis.

9. The optical device of claim 8, wherein the liquid crystal material is nematic.

10. The optical control device of claim 8, wherein the controllable angle with respect to the light transmission axis, is substantially zero in absence of a perturbing field and non-zero in presence of the field.

11. The optical device of claim 4, further comprising an optical system that allows light to pass through the optical element at least once, such that light from individual said domains interferes to produce an interference pattern.

12. The optical device of claim 11, further comprising at least one aperture wherein the interference pattern is created such that more or less light energy is directed to the aperture by controlling optical properties of the domains.

13. The optical device of claim 11, further comprising an optical system that allows the light to pass through the optical element and to reflect back through the optical element at least once, whereby the device has a reflective mode wherein an input and output may occur on a same side of the element.

14. The optical device of claim 11, wherein the optical system comprises a fiber lens collimator.

15. The optical device of claim 5, wherein the retardation of all the domains in the element is controllable together.

16. The optical device of claim 1, wherein the optical element defines an array of said local parts, each having a discrete area containing said domains.

17. An optical control device, comprising:
a structure defining a propagation path with an input and an output for an incident light beam, the propagation path having at least a portion in which the light beam is directed along a light transmission axis;
wherein the output is at least partly defined by at least one aperture, the aperture having a limited size in a direction perpendicular to the light transmission axis, whereby light aligned to the aperture can be passed through the control device, whereas light misaligned to the aperture is at least partly blocked;
a phase interference element placed along the propagation path, the phase interference device producing an interference pattern over an area that is larger than the aperture; wherein the phase interference element is controllable to vary the interference pattern such that more or less of the light energy is aligned to the aperture, thereby controlling an extent of coupling between the input for the beam and the output; and,
wherein the interference pattern has a zero order position that is aligned to the aperture, and the phase interference element varies a proportion of light coupled to the aperture versus another proportion of light that is blocked at the aperture, by providing one of a peak and a null at the zero order position.

18. The optical control device of claim 17, wherein the phase interference element comprises an electrically controllable phase plate.

19. The optical control device of claim 18, wherein the phase interference element comprises a birefringent element having a controllable optical retardation.

20. The optical control device of claim 19, wherein the phase interference element comprises randomly oriented domains of birefringent material, wherein a magnitude of retardation of said domains is alterable by application of an external stimulus.

21. The optical control device of claim 19, wherein the phase interference element comprises a liquid crystal material, and the liquid crystal material has at least two different director orientations at right angles to one another and at a controllable angle to the light transmission axis.

22. The optical control device of claim 20, wherein the controllable angle with respect to the light transmission axis, is substantially zero in absence of the stimulus and non-zero in presence of the stimulus.

23. The optical control device of claim 21, wherein the liquid crystal material has multiple domains, and the director orientation is random for said domains.

24. The optical control device of claim 17, wherein at least one of the input and the output contain a coupling for an optical waveguide.

25. The optical control device of claim 17, wherein at least one of the input and the output contain a coupling for an optical fiber waveguide.

26. The optical device of claim 20, wherein the magnitude of said retardation is altered by application of an electric field simultaneously to a plurality of said domains.

27. The optical device of claim 20, wherein the domains have a size selected for optimal performance at least at one predetermined wavelength.

28. The optical device of claim 27, wherein the predetermined wavelength is approximately 1550 nm.

29. The optical device of claim 20, wherein the magnitude of said retardation is substantially equal over the plurality of domains.

30. A method of controlling light transmission along a propagation path between an input and an output for an incident light beam that is directed along a light transmission axis, comprising the steps of: providing an output structure defining at least one aperture placed for passing light to the output, in a material that otherwise blocks light from reaching the output; providing a controllable phase interference element along the transmission path leading to the output; directing the incident light along the transmission axis toward the output, through the phase interference element, so as to produce an interference pattern containing peaks and nulls over an area that is larger than the aperture; controlling the phase interference element to vary the interference pattern such that more or less of the light energy is aligned to one or more of the peaks and nulls that corresponds to the aperture, thereby controlling an extent of coupling between the input for the beam and the output.

31. The method of claim 30, wherein said phase interference element comprises a material having a plurality of birefringent domains with controllable birefringence, and further comprising orienting directors of the domains in at least two orthogonal directions so that the interference pattern is varied for both of two orthogonal polarization components in a polarization insensitive manner.

32. The method of claim 30, wherein the phase interference element comprises a liquid crystal with substantially no birefringence absent a perturbing electric field, due to homeotropic corresponding alignment of directors at least at one surface of the liquid crystal cell, and wherein said controlling of the phase interference element comprises applying an external stimulus controllably to induce birefringence in said phase interference element.

33. The method of claim 32, wherein the external stimulus is an electric field applied across a plurality of domains in the phase interference element having randomly oriented directors.

34. The method of claim 32, wherein the homeotropic alignment is obtained at least partly by domains having oriented directors.

35. The method of claim 30, wherein the phase interference element has substantially non-zero birefringence absent a perturbing stimulus, due to homogeneous alignment of directors in domains, and further comprising application of a stimulus controllably to decrease a value of said birefringence in randomly oriented domains in the element.

36. The method of claim 35, comprising selecting a degree of randomness by partially orienting directors in a homogeneous alignment layer.

* * * * *